3,190,162
CUT-OFF MACHINE HAVING MEANS TO CLAMP WORKPIECE TO RECIPROCATING CUTTER CARRIAGE
Ralph E. Sonneland, Knoxville, Tenn., assignor by mesne assignments, to Tysaman Machine Company, Inc., Knoxville, Tenn., a corporation of Tennessee
Filed May 2, 1961, Ser. No. 107,130
5 Claims. (Cl. 83—285)

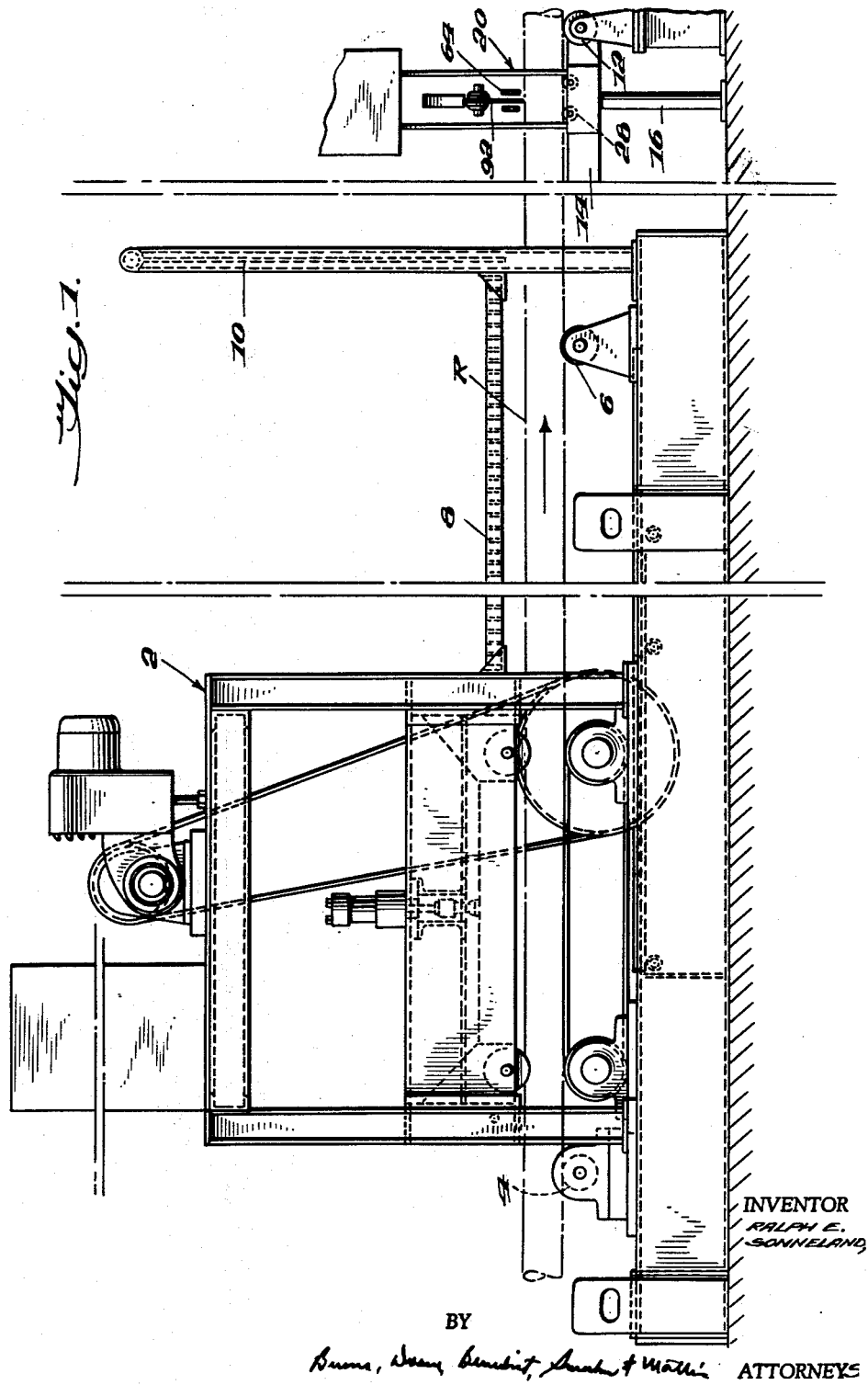

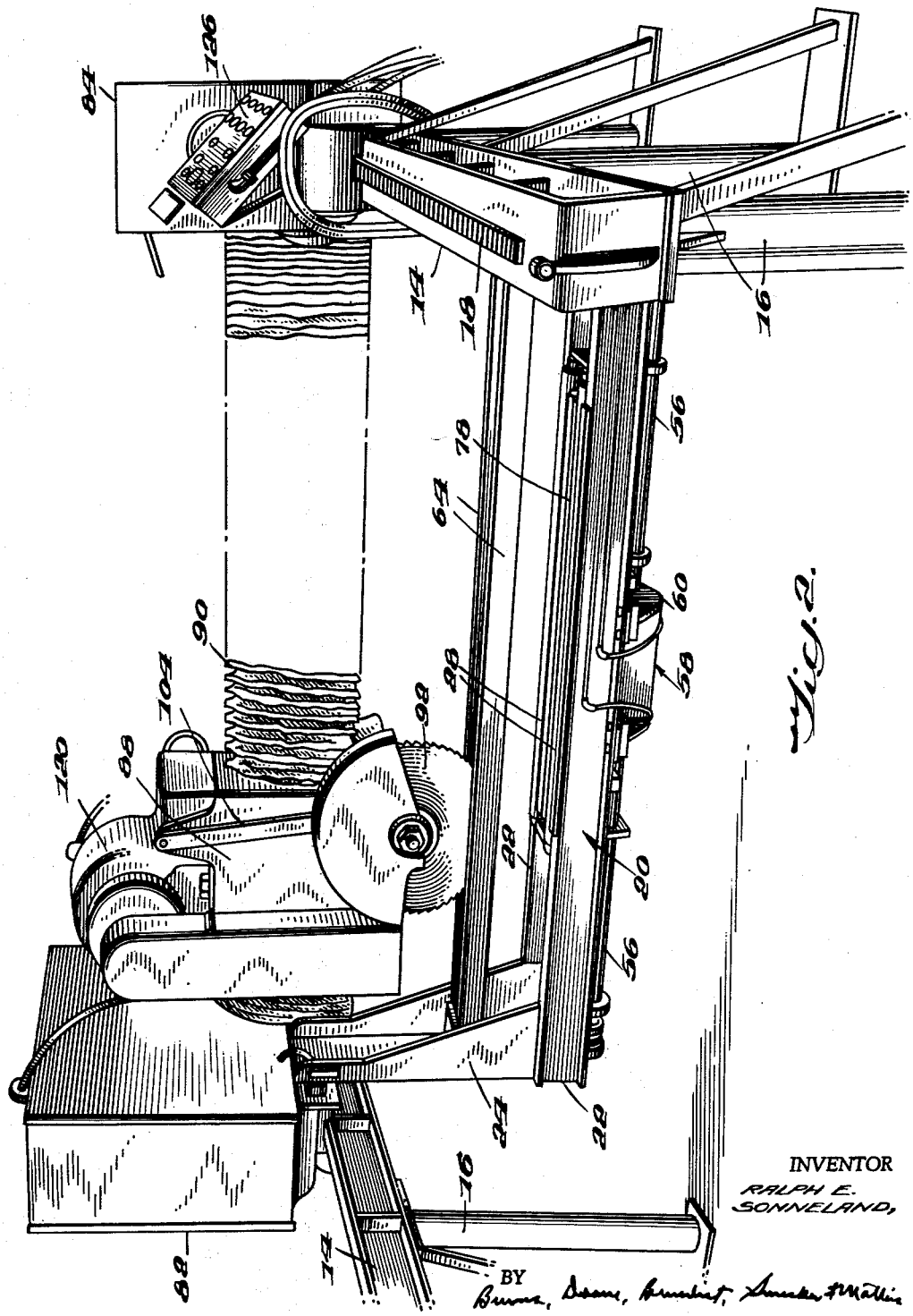

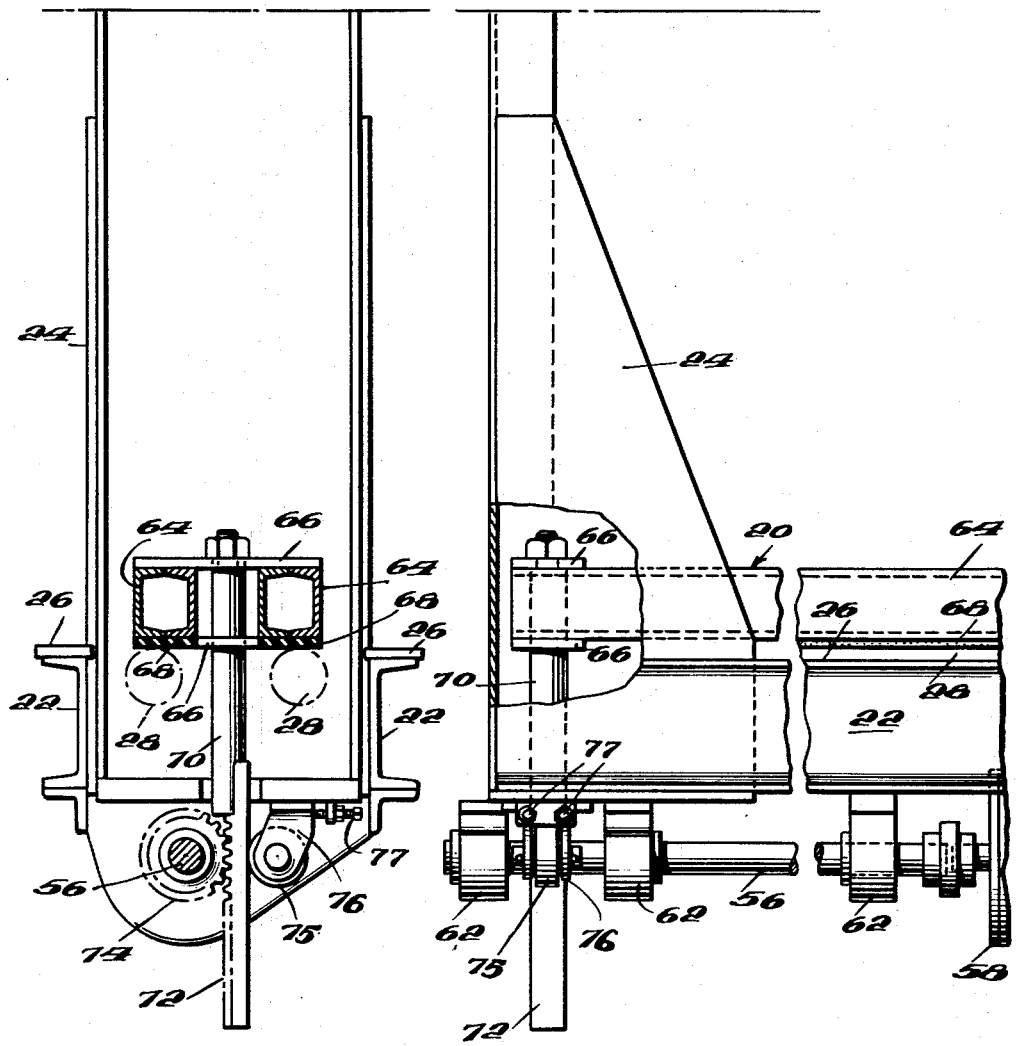

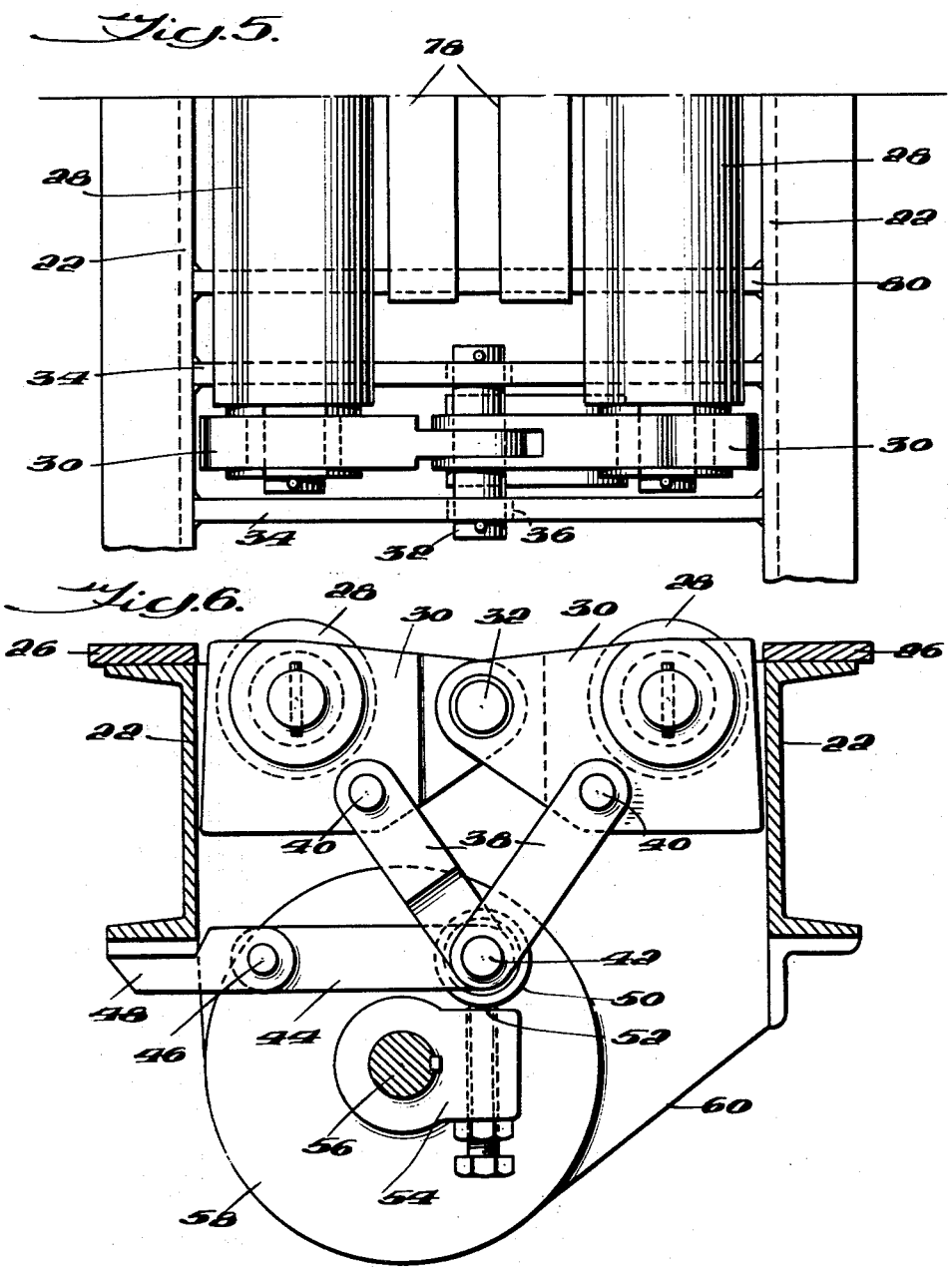

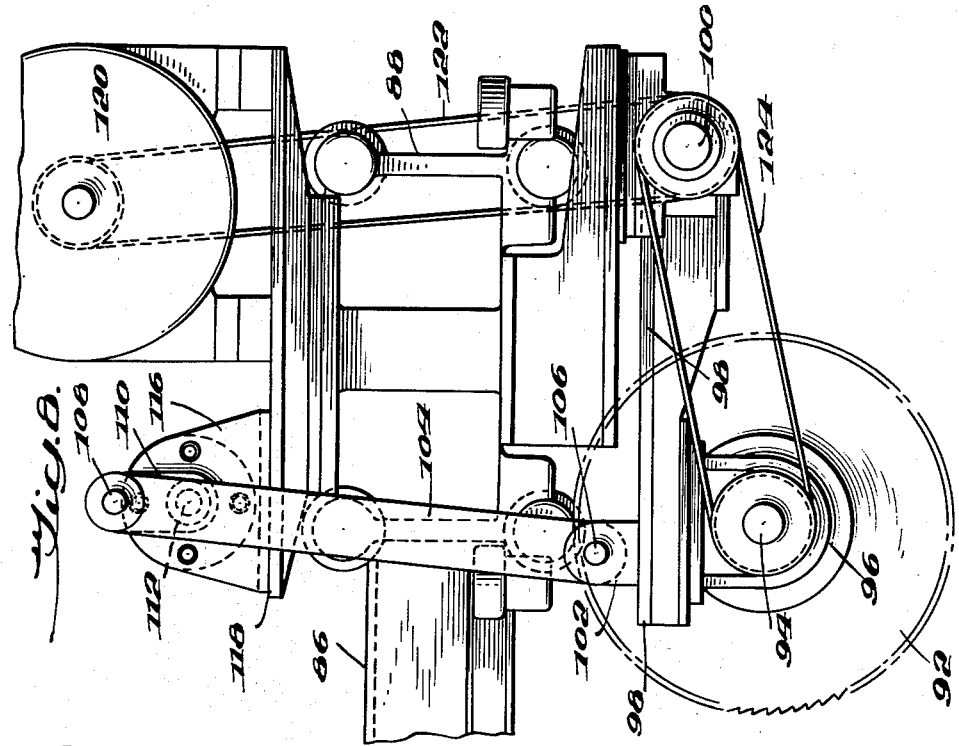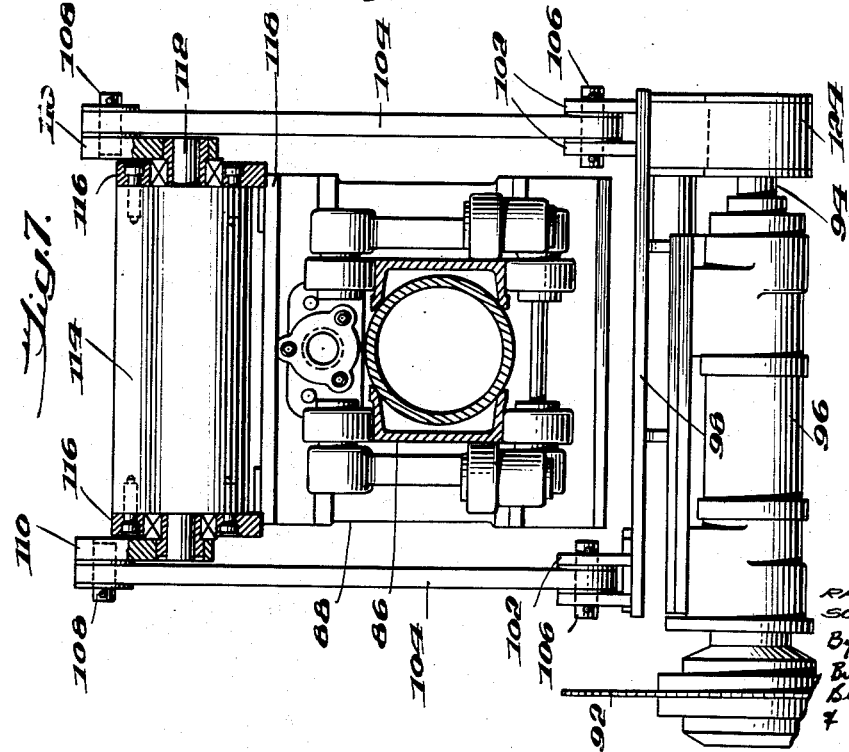

This invention relates to improvements in cut-off machines of the character used for cutting moving bodies of extruded or cast materials into desired lengths simultaneously with the movement thereof.

As an example, the invention may be used in cutting cast aluminum rods into the required rod lengths during the travel of the rods out of the casting machine and without stopping the casting procedure or discontinuing the travel of the rods.

Casting machines of this type usually form a plurality of rods in side-by-side relation, casting or extruding these in a continuous fashion and in continuous lengths. Various types of machines have been proposed heretofore for cutting such materials, but these have not been entirely satisfactory for the purpose.

One object of this invention is to provide for the cutting of the cast or extruded bodies in multiple assembly, as distinguished from the forming machine, into the required lengths and without stopping the forming operation or interfering with the travel of the formed bodies.

Another object of the invention is to simplify and improve cut-off machines to enable these to accomplish the required cutting operation in a simple and effective manner and during the continuous movement of the formed body.

Still another object of the invention is to provide for the automatic and continuous operation of the cut-off machine in severing the formed body or bodies into required lengths simultaneously with the continuous travel thereof and without interfering with the forming operation.

These objects may be accomplished, according to one embodiment of the invention, by providing a cut-off machine with a traveling table so disposed with relation to the forming machine and capable of being used in proximity thereto that the formed object or objects will travel over the table where an appropriate clamping action can be applied thereto during the cut-off operation. The traveling table is so mounted and driven that it will move continuously with the formed article and will not interfere with the forming operation nor stop the movement of the latter.

The cut-off machine is further provided, according to the preferred embodiment of the invention, with a power cutting tool such, for example, as a saw, which is operated after the clamping of the formed article or articles on the table, to sever the formed material or articles into appropriate lengths, as may be predetermined by the operator.

These movements may be accomplished sequentially, either automatically or under the manual control of the operator, as desired, with appropriate control features. The cut-off mechanism has provision for effecting movement of the tool linearly of the formed objects at the same speed as the movement of the latter, but capable of effecting faster operation on the return stroke so as to reposition the machine for another operation, with little loss in time. This increases the capacity of the machine to provide varying lengths of material without slowing the forming operation.

This embodiment of the invention is illustrated in the accompanying drawings, in which:

FIG. 1 is a diagrammatic side elevation of a forming machine, showing portions of the cut-off machine associated therewith;

FIG. 2 is a perspective view of the cut-off machine;

FIG. 3 is a detail cross-section through a portion of the traveling table;

FIG. 4 is a partial side elevation thereof;

FIG. 5 is a top plan view of a portion of the traveling table;

FIG. 6 is a cross-section therethrough;

FIG. 7 is a cross-section through the rail and showing the saddle assembly mounted thereon in elevation; and FIG. 8 is a side elevation thereof.

The invention is illustrated, according to one embodiment thereof, as capable of sawing or cutting a plurality of cast aluminum rods simultaneously with the formation of the latter and as these are discharged from a casting machine in continuous lengths and in side-by-side relation. It will be understood, however, that the invention may be used, if desired, in connection with different types of forming machines that extrude or cast bodies, either singly or in multiple, and whether formed in rod, sheet or other desired shapes.

As shown in FIG. 1, a portion of a casting machine is illustrated for forming a plurality of cast aluminum rods disposed in side-by-side relation through a control table, generally indicated at 2, over idler rolls 4 and 6. The formed rods are indicated at R and normally issue from the forming machine beneath a grating 8 which extends from the control table 2 to a guard support 10. The formed rods R also pass over idler rollers 12 spaced linearly of the rods from the idler roller 6. The cut-off machine is located between the idler rollers 6 and 12, as illustrated in FIG. 1. These idler rollers 6 and 12 support the rods on opposite sides of the point of cut-off, but allow for continuous travel of the rods during the cut-off operations.

The cut-off machine is adapted to travel rectilinearly of the formed rods R on track rails 14, shown in FIGS. 1 and 2, which rails 14 are spaced apart transversely of the forming machine on opposite sides thereof and are supported at intervals on posts 16. Each of the rails 14 is provided on its upper surface with a rack 18 as a convenient and desirable means of causing the cut-off machine to be moved rectilinearly of the formed rods, as will be described more in detail hereinafter.

Extending transversely of the assembly of formed rods R is a traveling table 20 having an upper surface substantially at the bottom surface of the formed rods or approximately at the same height as the idler rollers 6 and 12. This traveling table 20 is adapted to move lengthwise of the formed rods to the point of cut-off thereof and then to travel with the formed rods during the cut-off operation. The traveling table is shown more in detail in FIGS. 3 to 6.

The traveling table 20 comprises a pair of transversely spaced frame bars 22 which extend substantially throughout the distance between the guide rails 14 and have their opposite ends fixed rigidly, as by welding, to mounting brackets 24 that extend upwardly from the table. Ledge plates 26 are secure to the upper edges of the bars 22, at least in the intermediate portion thereof, against which the material is clamped.

In the intermediate portion of the table 20, between the bars 22, a pair of lift-up rollers 28 are mounted. The opposite ends of the rollers 28 are journaled in bearing blocks 30 that extend from the inner faces of the bars 22 inwardly toward each other. The inner ends of the bearing blocks 30 have an overlapping interfitting relation and are pivoted together by a pivot pin 32 at each opposite end of the pair of rollers.

The side bars 22 are held spaced apart adjacent the ends of the rollers by guide plates 34 which extend transversely in bridging relation between the inner faces of the bars 22 to which said guide plates are welded or otherwise securely fastened. These guide plates 34 are notched out at the top sufficiently to accommodate the rollers 28 and to allow for vertical shifting movement thereof.

The bearing blocks 30 are located between a pair of said guide plates 34, as shown in FIG. 5, and the pivot pin 32 is mounted in a hole 36 in each of said guide plates, so as to permit of shifting movement of the blocks 30 about the pivot pin during shifting of the rollers 28.

The pair of lift-up rollers 28 are capable of being raised and lowered together, relative to the side bars 22 of the traveling table, by a pair of links 38 shown in FIG. 6. One of the links 38 is pivoted at 40 to each of the bearing blocks 30 and the opposite end of each link 38 extends to a pivot pin 42 which connects the links with one end of an arm 44. The opposite end of the arm 44 is pivotally connected at 46 with a support bracket 48 mounted on the underside of the adjacent side bar 22, as shown in FIG. 6.

The pivot pin 42 is surrounded by a bushing 50 against the periphery of which an eccentric pin 52 bears. The eccentric pin 52 extends through an eccentric member 54 mounted on a shaft 56 axially of an air-driven torque actuator 58 which is supported at their underside of the table 20 in a housing 60. The torque actuator 58 is of well-known construction and need not be illustrated in detail.

A mounting assembly for the pair of rollers 28 is provided at each opposite end of the pair, with the torque actuator 58 between the ends, as illustrated in FIG. 2.

Extending in opposite directions from the torque actuator 58 are the shafts 56 which project substantially to the ends of the traveling table 20, as illustrated in FIG. 4. Each shaft 56 is journaled in bearing blocks 62 secured to the underside of one of the side bars 22.

Mounted over the table assembly is a hold-down assembly comprising clamping bars 64 spaced apart transversely of the side bars 22, as shown in FIG. 3, with connecting bars 66 extending therebetween. The underfaces of the clamping bars 64 are provided with rubber faces 68 in the region where the material is to be clamped, so as to effect a smooth clamping action thereon as, for example, in opposed relation to the rollers 28.

At each end of the hold-down assembly, the latter is provided with an upright shaft 70 extending downward between the side bars 22 of the traveling table 20, with a rack 72 on the lower end portion of the bar 70. The rack 72 interfits with a pinion 74 (FIG. 3) mounted on the shaft 56, so that rotation of the shaft will raise and lower the hold-down assembly. A back support roller 75 bears against the opposite side of the rack 72, opposite from the pinion 74. The back-up roller 75 is mounted in a bracket 76 secured to the underside of the traveling table and capable of adjustment relative thereto as provided by an adjustment screw 77, so as to maintain proper guiding and interfitting relation between the rack 72 and the pinion 74.

As shown in FIGS. 5 and 6, a pair of support bars 78 are mounted between the lift-up rollers 28, being supported at opposite ends on support plates 80 extending transversely between the side bars 22. The bars 78 are mounted with the top surfaces thereof in the same horizontal plane as the top surfaces of the plates 26, being machined to be flush therewith, if necessary. The bars 78 are spaced apart equi-distances on opposite sides of the vertical plane through which the cutting member operates, as hereinafter described.

Mounted on each of the track rails 14 is a tram assembly, generally indicated at 82 and 84, one on each of the respective rails. The tram assemblies 82 and 84 include supporting wheels mounted on the surfaces of the rails in guided relation therewith and having power-driven geared connected with the racks 18, so as to propel the respective assemblies back and forth along the lengths of the respective rails.

These assemblies 82 and 84 support the traveling table 20 which extends in bridging relation therebetween. The upper ends of the brackets 24 are welded or otherwise rigidly fixed to the inner faces of the tram assemblies, so as to support the traveling table in a suspended relation between the rails 14 in position to receive over the traveling table 20 the lengths of rods, sheets, etc., discharged from the forming machine.

The details of the tram assemblies are not here disclosed because any suitable or desired form thereof may be used. The power means for effecting traverse of these assemblies along the rails and mounting thereof on the rails form no part of the invention here claimed except as herein described.

Extending transversely between the tram assemblies 82 and 84, is a transverse rail 86. This rail 86 may be of unitary construction or it may be fabricated as shown in FIG. 7. The opposite ends of the rail 86 are fixed to the tram assemblies so as to move therewith lengthwise of the rails 14 in one unitary assembly, either under the control of the operator or under automatic control, as described.

Mounted on the transverse rail 86 is a saddle assembly 88 which is in proper guided relation thereto as to move along the rail 86 from one side to the other. Suitable power means is provided in the saddle assembly 88 to propel the latter along the rail 86. The portions of the rail 86 on opposite sides of the saddle assembly 88 between the latter and the respective traverse assemblies 82 and 84 are covered by flexible bellows sections 90, so as to protect the bearing surfaces of the transverse rail and yet to permit of freedom of movement of the saddle assembly therealong.

A friction saw or other cutting or surfacing tool is designated generally at 92. The tool 92 is mounted on an arbor 94 which extends transversely of the saddle assembly 88 within a bearing sleeve 96, as shown in FIGS. 7 and 8. The bearing sleeve 96 is secured to the underside of a spindle mounting plate 98 adjacent one end of the latter. This spindle mounting plate 98 is supported at its opposite end by being journaled on a transverse shaft 100 which is supported on the underside of the saddle assembly 88. Thus, the plate 98 can rock in a vertical direction so as to raise and lower the operating position of the tool 92.

Mounted on the plate 98 adjacent opposite edges thereof, as shown in FIG. 7, and over the end on which the spindle 94 is mounted, are brackets 102 disposed in pairs spaced apart and receiving between the brackets of each pair the lower end of a connecting arm 104. Each connecting arm 104 is pivotally connected on a suitable pivot pin 106 with the brackets 102. Anti-friction or other suitable bearings may be provided between the arms and the pivot pins, as considered desirable.

The connecting arms 104 extend upwardly from the supporting plate 98 to crank pins 108 projecting outwardly eccentrically of crank arms 110. Suitable bearing means may be provided between the upper ends of the arms 104 and the crank pins 108, as described above.

The crank arms 110 are secured upon opposite ends of a power shaft 112 of a pneumatic rotary torque actuator 114 which is mounted between bearing brackets 116 supported on the top plate 118 of the saddle assembly 88.

Also supported upon the top plate 118 is a power motor 120 having a driving belt connection 122 to one end of the shaft 100. The opposite end of the shaft 100 is connected through a driving belt connection 124 with the spindle 94 on which the power tool 92 is mounted.

The cut-off machine may be used in any appropriate manner, although shown in FIG. 1 in association with the formation of a plurality of rods for cutting these into lengths without interfering with the rectilinear movements thereof. The control of the cut-off machine may be either manual or automatic, as desired. If automatic operation is contemplated, the sequence of movements can be controlled by suitable limit switches, so as to effect the required actuation.

A control panel is shown at 126 in FIG. 2, having suitable pre-set control elements by which the operator can set the machine to operate according to predetermined lengths of the material, or this panel 126 may control manually selected electrical controls for each of the separate operations of the machine. The control panel 126 is associated with the head unit 84.

Initially, the parts are in the relative position shown in FIG. 2, with the air clamp bars 64 raised away from the lift-up rollers 28 and with the saw 92 in its retracted position at the left in FIG. 2. The material to be severed, in this instance the series of rods R issuing from the forming machine, passes over the lift-up rollers 28 between the latter and the clamp bar 64, as will be apparent from FIG. 1.

An initial cut may be made under the control of the operator, so that all of the rods will be of uniform length. Thus, all of the ends will be even. Then, as soon as the predetermined length of material has issued from the forming machine, the cutting operation is repeated after measuring off the desired length.

The cut-off machine will be moved rectilinearly of the tracks 14 to position the tool 92 substantially at the proper position for cut-off with respect to the material, after which the drive mechanism of the respective heads 82 and 84 will be controlled, so as to move the cut off machine along the tracks in the same timed relation with the issuing of the material from the forming machine. This may be done by controlling the driving motors of these respective heads with reference to the speed of movement of the material. The initial stroke opposed to the direction of movement of the material should be at a very fast rate, whereas the movement of the cut-off machine along with the material should be at whatever speed the material is issuing and progresses.

When the cut-off machine reaches the point where a cut is to be made with respect to the material, the torque actuator 58 is energized by the supply of fluid thereto, to rotate the shafts 56 (FIGS. 3 and 4), thereby retracting the rolls 28 and permitting the formed rods to rest on the plates 26 and the bars 78. At the same time, the clamping bars 64 are lowered into clamping engagement with the plates 26, and the cutting tool 92 will be lowered, due to the rotation of the cranks 110 by the torque actuator 114, as shown in FIGS. 7 and 8. The cranks 110 will move from the up position illustrated in FIG. 8 to the opposite, or down, position, to afford sufficient lowering action of the tool 92 through its cutting stroke. This tool or saw 92 will be driven continuously from the motor 120, as described.

The traverse mechanism will then be actuated to move the cut-off device lengthwise of the supporting rail 86, thereby severing the material or series of rods throughout the entire width thereof. Since the cut-off machine will be clamped to the material or rods during this cut-off operation and the tram heads 82 and 84 will be traveling with the continually projecting material or rods, the cut-off operation will not interfere with the forming operation, but will proceed in sequence therewith.

This transverse movement of the tool or saw 92 throughout the width of the material or rods will progress relatively slowly, sufficient to provide a uniform cut, but as soon as the entire width has been traversed, the machine functions either automatically or under the control of the operator, to release the connection therewith by raising the clamping bars 64 and the cutting tool 92. The raising of the clamp bars 64 and the cutting tool 92, also raises the rollers 28 through the action of the torque shaft 56, turning counter-clockwise as viewed in FIG. 6. The rotation of the shaft 56 effects this combined action because both the roll bearing linkage 38 and the pinion 74 are actuated by the same shaft. This allows the entire cut-off machine to be moved rectilinearly of the forming material to another point for cut, where the operation is repeated.

After this traverse of the cut-off machine lengthwise of the material, to another point for cut, the torque actuator 58 will cause rotation of the shaft 56 and the eccentric member 54 to be turned in a clockwise direction, as viewed in FIG. 6, thus lowering the rollers 28 out of contact or bearing relation with the material long enough for clamping material at a second point for another severing operation.

While the invention has been illustrated and described in one embodiment, it is recognized that variations and changes may be made therein without departing from the invention, as set forth in the claims.

I claim:

1. A cut-off machine for severing a moving length of formed article in a direction transverse to the direction of movement of such article comprising:
   a traveling table having at least one upper surface for supporting a length of moving article to be severed;
   a pair of rollers mounted on said table, means mounting the rollers for selective movement between a lower position beneath said upper supporting surface and an upper position to extend at least partially above said upper supporting surface, links connected with the mounting means for raising and lowering the rollers upon displacement of the links;
   clamping means having a movable clamping surface spaced above the upper supporting surface of said traveling table;
   power means having an operating shaft extending longitudinally of the table, cam means secured on the shaft in position to engage the links, means for connecting said clamping means with said shaft, said cam means and said connecting means lowering said rollers and said clamping means upon rotation of said shaft in one direction, and raising said clamping means to release the article and raising said rollers at least partially above said upper supporting surface upon rotation of said shaft in the opposite direction.

2. A cut-off machine for severing a moving length of formed article in a direction transverse to the direction of movement of such article comprising:
   a traveling table having at least one upper surface for supporting a length of moving article to be severed;
   roller means mounted on said table for selective movement between a lower position beneath said upper supporting surface and an upper position to extend at least partially above said upper supporting surface;
   a clamping member spaced above the upper supporting surface of said traveling table;
   power means having an operating shaft extending longitudinally of the table, an upright shaft extending from the clamping member, said upright shaft having a rack thereon, said operating shaft having a pinion secured thereon in mesh with said rack, means for connecting the roller means with the shaft, said pinion and said connecting means lowering said clamping means and said rollers, respectively, upon rotation of said operating shaft in one direction and raising said clamping means and said rollers at least partially above said upper supporting surface upon rotation of said operating shaft in the opposite direction.

3. A cut-off machine of the character described comprising an elongated traveling table having a clamping surface and a pair of rollers extending lengthwise of the table in positions for supporting material transversely thereon during forming operation of the material, means mounting the rollers for raising and lowering movements, power drive means including a shaft extending longitudinally of the table, adjusting means operatively connected with the roller mounting means, means operatively connected eccentrically of the shaft in position for actuating the adjusting means for the rollers to move the rollers into and out of supporting positions for the material, means for clamping the material on the clamping surface, and means for severing the material while held by the clamping means along a line between said pair of rollers.

4. A cut-off machine of the character described comprising an elongated traveling table having a pair of rollers extending lengthwise thereof in positions for supporting material transversely thereon during forming operation of the material, means mounting the rollers for raising and lowering movements, links connected with the mounting means, a power motor having an operating shaft connected therewith, eccentric means on the shaft for moving the links simultaneously to raise and lower both of the rollers between positions above and below the level of said table, a clamping member over the rollers, and means operatively connected with the shaft for lowering the clamping member into clamping engagement with the material.

5. A cut-off machine of the character described comprising an elongated traveling table having a clamping surface and a pair of rollers extending lengthwise of the table in positions for supporting material transversely thereon during forming operation of the material, means mounting the rollers for raising and lowering movements, links connected with the mounting means, a power motor having an operating shaft connected therewith, eccentric means on the shaft for moving the links to raise and lower both of the rollers simultaneously with respect to the material, a clamping member above the rollers, means operatively connected with the shaft for lowering the clamping member into clamping engagement with the material, and means for severing the material while held between the clamping member and surface along a line extending parallel to and between said pair of rollers.

References Cited by the Examiner

UNITED STATES PATENTS

| 1,439,963 | 12/29 | Kamper | 83—319 X |
| 1,936,331 | 11/33 | Lawson | 29—69 |
| 2,005,052 | 6/35 | Rubin | 26—69 |
| 2,086,374 | 7/37 | Wikle et al. | 83—318 X |
| 2,287,833 | 6/42 | Ridgway | 83—292 |
| 2,293,260 | 8/42 | Johnston | 83—319 X |
| 2,509,760 | 5/50 | Crafton | 164—49 |
| 2,696,884 | 12/54 | Mishler et al. | 83—318 |
| 2,707,816 | 5/55 | Henderson | 83—308 |
| 3,072,004 | 1/63 | Jenkins | 83—341 X |

FOREIGN PATENTS 473,897    3/29    Germany.

ANDREW R. JUHASZ, *Primary Examiner.*

CARL W. TOMLIN, WILLIAM W. DYER, Jr.,
*Examiners.*